United States Patent [19]

Seiter

[11] 4,057,029

[45] Nov. 8, 1977

[54] TIME-TEMPERATURE INDICATOR

[75] Inventor: Charles Seiter, Los Angeles, Calif.

[73] Assignee: Infratab Corporation, Santa Monica, Calif.

[21] Appl. No.: 664,998

[22] Filed: Mar. 8, 1976

[51] Int. Cl.² ................... G01K 3/04; G01K 11/12
[52] U.S. Cl. .......................... 116/114 V; 73/356; 116/114 Y
[58] Field of Search ................ 73/356, 362.3; 116/114 AM, 114 V, 114 Y, 114.5; 128/2 H

[56] References Cited
U.S. PATENT DOCUMENTS

| 3,065,083 | 11/1962 | Gessler | 116/114.5 |
| 3,233,459 | 2/1966 | Gleason et al. | 116/114 V |
| 3,967,579 | 7/1976 | Seiter | 73/356 X |

Primary Examiner—Richard C. Queisser
Assistant Examiner—Charles Gorenstein
Attorney, Agent, or Firm—Fulwider, Patton, Rieber, Lee & Utecht

[57] ABSTRACT

A time-temperature indicator having a time-temperature sensitive component including a layer of material which at temperatures above a predetermined transition temperature changes from an impermeable, psuedo-crystalline state to a permeable, liquid-crystalline state. A reactant material having a predetermined rate of diffusion through the layer at temperatures above its transition temperature is maintained out of contact with an indicator by the layer at temperatures below the transition temperature. A container for the time-temperature component includes a transparent face for viewing the time-temperature component. The container is adapted for attachment to an object, such as to the package of a time and temperature sensitive product to visually indicate the product has been exposed above a particular temperature far in excess of a certain period of time.

21 Claims, 3 Drawing Figures

TIME-TEMPERATURE INDICATOR

BACKGROUND OF THE INVENTION

The invention relates to temperature indicating devices and more particularly to such devices for the visual indication that the device has been maintained at or above a predetermined temperature over a predetermined period of time.

Many materials, such as for example, photographic film, pharmaceutical and biological products, perishable foods and the like, must be stored under the prescribed temperature conditions and for limited periods of time in order to retain the freshness or effectiveness of the product. Normally, however, the appearance of the product is such that the consumer or user cannot determine whether the product has been properly stored or is still in a useful condition at the time of purchase or selection for use.

To overcome this problem various temperature indicators, or telltales, have been developed to indicate the temperature history of a product. Typically, these devices include a temperature sensitive material which flows at or above a preselected temperature for contact with a suitable indicator material to visually indicate that the device and presumably the product has been exposed to temperatures exceeding the design for storage temperature.

Although generally such devices are designed only to indicate that a particular temperature has been exceeded, some prior art telltale devices have been designed to relate both time and temperature.

One such device is disclosed in U.S. Pat. No. 2,782,749 and is based upon the use of temperature sensitive materials having non-specific melting points, such as fats and waxes, which gradually become less viscous as temperature increases. These temperature sensitive materials are formed as a layer on a porous paper barrier and as the temperature increases, the fat or wax begins to soften and eventually diffuses through the paper and reaches a point of visibility on the opposite side of the barrier. The diffusion rate of the material through the barrier is directly related to the temperature. Devices of this type, due to the nature of the fats and waxes, have a relatively narrow temperature range at which they can be used and it is difficult to control the diffusion rate through the paper barrier. In addition, the paper barrier must be relatively thick, on the order of 0.75 inches, so that the device is relatively bulky and may give rise to handling and storage problems when attached to packages or containers.

SUMMARY OF THE INVENTION

The present invention relates to a time-temperature indicating device which provides a visual signal when it has been maintained at or above a predetermined temperature in excess of a predetermined period of time. By the proper combination of materials, the device is adapted to measure a wide range of temperatures and times. The device is inexpensive and relatively simple to manufacture, and can be adapted for easy attachment to substantially any type of package or container for time-temperature sensitive goods. The device, in its preferred form, is non-bulky, being on the order of only a few millimeters in thickness, and furthermore is relatively resistant to shock and other factors normally encountered during package or container handling.

More particularly, the device of the invention comprises a diffusion layer capable of transition between an impermeable state and a permeable liquid-crystalline state at a clearly defined temperature. An indicator film is disposed on one side of the diffusion layer and is separated thereby from a reactant material capable of producing a visual reaction when in contact with the indicator film. At temperatures below the transition temperature, the diffusion layer is in a psuedo crystalline state and is impermeable with respect to the reactant. Above the transition temperature, the diffusion layer is in a smectic, liquid-crystal state which permits the reactant to diffuse at a predetermined rate through the layer to contact the indicator.

The rate of diffusion and the transition temperature for the device are based upon the proper selection of reactant and lipoid. Accordingly, by proper combinations of materials, devices can be constructed according to the invention which operate over a variety of temperatures and time periods to provide a time-temperature indicator for most temperature sensitive products.

These and other advantages and features of the invention will become apparent from the following detailed description taken in conjunction with the drawings.

DESCRIPTION OF THE INVENTION

Figure 1:
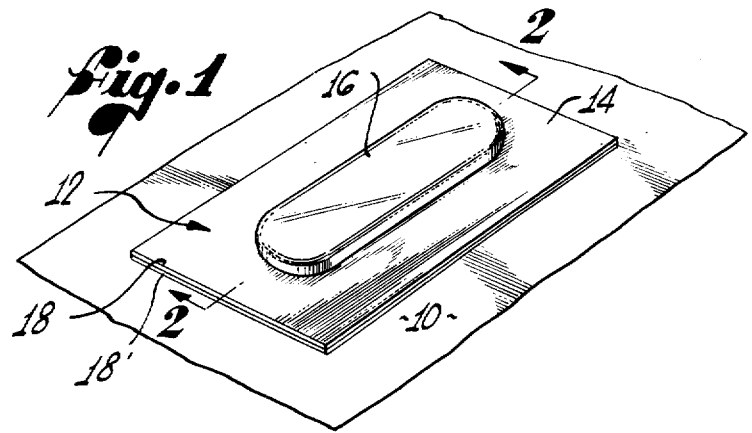
FIG. 1 is a perspective view of a time-temperature indicator constructed in accordance with the invention, showing the indicator affixed to a package for temperature sensitive goods, portions of the package being broken away for compactness of illustration.

In FIG. 1 there is shown a package 10 for a temperature sensitive product, such as for example, photographic film, which deteriorates over a period of 1 to 7 days, depending upon the type of film, at or above room temperature (24° C). A time-temperature indicator for visual indication when the package 10 has been maintained at or above 24° C in excess of the permissible period is shown generally as 12. The indicator 12 includes a generally planar base portion 14 which is advantageously provided on its lower surface with an adhesive for attachment to the package 10. A central portion 16 on the upper surface of the base 14 encloses and contains the time-temperature sensitive components of the indicator 12. At least the central portion 16 is transparent for viewing the contents thereof although the base 14 may also be transparent.

In the embodiment shown, the base 14 and central portion 16 are formed by upper and lower sheets 18 and 18' of a hydrophillic, non-porous material. For example, cellulose acetate or cellophane sheet material is used with good results and for convenience of manufacture. Both sheet 18 and 18' may be transparent.

Figure 2:
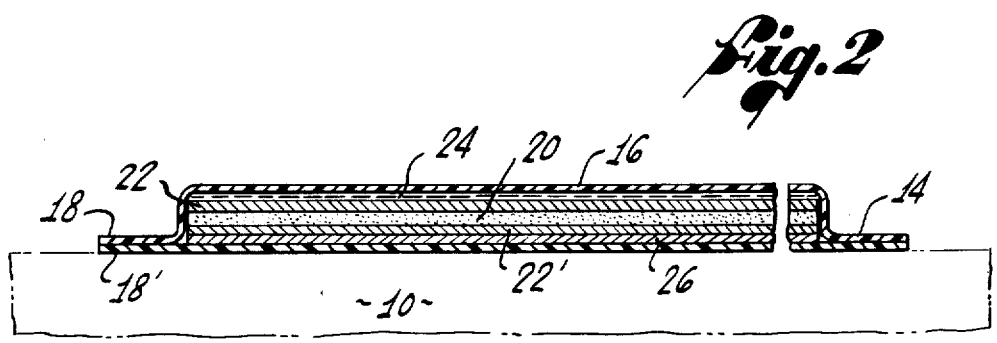
FIG. 2 is an enlarged sectional view taken through line 2—2 of FIG. 1.

As is shown in FIG. 2, the time-temperature sensitive components of the indicator 12 include a lipoid diffusion layer 20 having an oriented molecular structure which below a clearly defined temperature defines an impermeable pseudocrystalline state and above the critical temperature defines a permeable, smectic or liquid-crystalline state. The temperature at which the layer 20 changes states is referred to as the transition temperature. In accordance with the invention, the transition temperature corresponds to the spoilage or deterioration temperature of the product. The diffusion layer is disposed between strips of permeable dialysis membrane 22 and 22' which are water wetted to aid in orienting the molecules of the diffusion layer during assembly of the indicator 10 as will be described hereinafter.

A reactant material 24 is disposed above the diffusion layer 20 and is contained in the space between the dialysis membrane 22 and the upper plastic sheet 18. The reactant 24 must be flowable at the transition temperature of the diffusion layer 20 and may be in a liquid or fused condition below the transition temperature since the diffusion layer is in the psuedo-crystalline impermeable state and diffusion of the reactant through the diffusion layer cannot occur.

An indicator material 26 is disposed as a coating or layer on the sheet 18' below the dialysis membrane 22'. The indicator 26 undergoes a visible reaction when contacted by the reactant 24. The indicator 26 may be disposed as a separate layer or coating or may be bonded to the surface of the sheet 18'.

The diffusion layer 20 is characterized as a film of organic molecules having hydrophilic and lipophilic groups which are oriented with the long axis of the molecules substantially perpendicular to the plane of the layer. An additional film may be applied over the first to form a bi-layer, normally with the hydrophilic groups of the molecules located at the surfaces of the bi-layer and the lipophilic portions extending inwardly. The bi-layers may be stacked until the diffusion layer 20 is of desired thickness, normally on the order of 1 mm.

The orientation of the molecules is readily achieved by forming a molecular film on a hydrophilic surface such as a surface of water or on the water wetted dialysis membrane, thus resulting in the hydrophilic groups orienting themselves towards the film-water interface while the lipophilic groups are repelled by the hydrophilic surface. The bi-layer is formed by the application of a second film over the first resulting in an attraction of the lipophil groups toward the film-film interface while the hydrophilic groups are repelled and oriented towards the upper surface of the bi-layer. Other techniques for producing oriented molecular films are known and for example, the molecules may be oriented by magnetic means.

Materials capable of passing through a transition between the impermeable psuedo-crystalline and the smectic, permeable, liquid-crystalline states and the techniques for the preparation and for forming films of such materials are known in the art and do not per se form a part of this invention. For the purposes of description, however, materials used to form the diffusion layer 20 are characterized as surface active materials comprising mixtures of organic acids, such as fatty acids, and the organic bases, such as alcohols, each having between 8 and 20 carbon atoms in their molecules.

Compositions possessing the desired properties and suitable for use in forming the diffusion layer 20 include the phospholipids such as egg lecithin, soya lecithin, dimyristol lecithin, phosphatidyl choline, phosphatidyl serine and the like. Other systems such as decanol sodium caprylate, hexanol cetylmethylammonium bromide are effective as possessing clearly defined transition points between the psuedo-crystalline impermeable state and liquid-crystalline, permeable state.

Highly preferred for use in the invention are phospholipids such as the lecithins and typical lecithin systems including their transition temperatures are set forth in Table A below.

The transition temperature for each system will vary depending upon the composition of the system, the molecular size and saturation and the type and number of polar groups on the molecules of the compositions used in forming the system. The selection of materials used in forming the diffusion layer 20 is primarily dependent on the spoilage or deterioration temperature of the product to be sensed by the indicator 12 of this invention. For example, by varying the molecular chain length and degree of saturation, diffusion layers can be formed having transition temperatures ranging between $-22°$ C to $+60°$ C. The transition temperature can also be adjusted by the presence of other surface-active materials in the diffusion layer which themselves do not have a liquid-crystal state, for example, cholesterol. The presence of divalent cations, such as calcium or magnesium will also affect the temperature at which the lipoid changes state and can be used to adjust the transition temperature.

TABLE A

| Diffusion Layer | Transition Temperature °C |
|---|---|
| Dioleoyl lecithin | $-−22°$ |
| Egg Yolk lecithin (a mixture) | $−5 - +10°$ |
| 1 Stearoyl 2-oleoyl lecithin | $+3°$ |
| Dimyristoyl lecithin | $+23°$ |
| Dipalmitoyl lecithin | $+41°$ |

The transition temperature of the above systems can be raised on the order of 5° C by the addition of divalent cations, such as calcium or magnesium ions. Likewise the transition temperature can be lowered about 5° C by cholesterol.

In operation, the diffusion layer 20 of the indicator 12, so long as it is maintained below the transition temperature, is impermeable and the reactant 24 is separated from the indicator 26. As the indicator 12 is exposed to temperatures at or above the transition temperature of the composition forming the diffusion layer 20, the composition takes on the permeable, smectic, liquid-crystal state and the reactant 24 begins to diffuse through the diffusion layer at a predetermined rate and contacts the indicator 26 to produce a visible change in the appearance of the indicator. The rate of diffusion of the reactant 24 determines the length of the period at which the time temperature indicator 12 can be maintained at or above the transition temperature of the diffusion layer.

The diffusion rate of the reactant 24 through the diffusion layer 20 is primarily a function of both the thickness of the diffusion layer and the nature of the reactant. For all practical purposes the composition of the diffusion layer 20 is not determinative of the diffusion rate. It is highly preferred to control the diffusion rate, and thus the measured time period, by altering the reactant 24 rather than by varying the thickness of the diffusion layer. Thus, by increasing the chain length or the polarity of the reactant, the rate of diffusion through the diffusion layer 20 is decreased and the time period for the reactant to reach the indicator is increased.

Among the materials useful as reactants are the organic acids and bases which are liquids at the transition temperature and which will produce a highly visible color change in most common pH sensitive indicator materials. Thus, for example, both aliphatic and aromatic organic bases may be employed such as lauryl diethylamine or aniline. Aniline is preferred in view of the ease in which the polarity can be changed by substitution at the amine group or on the benzene ring, thereby to change the diffusion rate.

Organic acids are also excellent reactant materials, such as for example, aliphatic saturated and unsaturated monocarboxylic acids containing up to 10 carbon atoms. The diffusion rate of the organic acid is directly related to its chain length with the molecules of longer chain lengths having a lower diffusion rate than those with shorter chains.

In addition to pH sensitive reactant-indicator systems discussed above, other reactant-indicator systems are used such as those which undergo visible oxidation-reduction reactions or which form visible complexes. For example, compounds such as $\beta$-napthol or substituted pyridine, can be used as the reactant to form a highly colored metal complex with an indicator formed by bonding metal ions, such as iron or chromium, to the sheet 18' by means of a suitable chelating agent, such as ethylenediaminetetraacetic acid and the salts thereof.

By way of example, Table B sets forh representative reactants, their approximate diffusion times through a 1 mm lipoid layer and typical indicators used with the reactants.

TABLE B

| Reactant | Diffusion time | Indicator |
|---|---|---|
| Lauryl diethylamine | 1 day | alizarin |
| Decanoic acid | 5 days | bromcresol green |
| m-chloroaniline | 12 hours | Na-indigo Sulfonate |
| Guanidine | 3 hours | phenolphthalein |
| Dodecanoic acid | 7 days | methyl violet |
| Propanoic acid | 3 hours | methyl orange |
| Oleic acid | 3 days | bromthymol blue |

Figure 3:
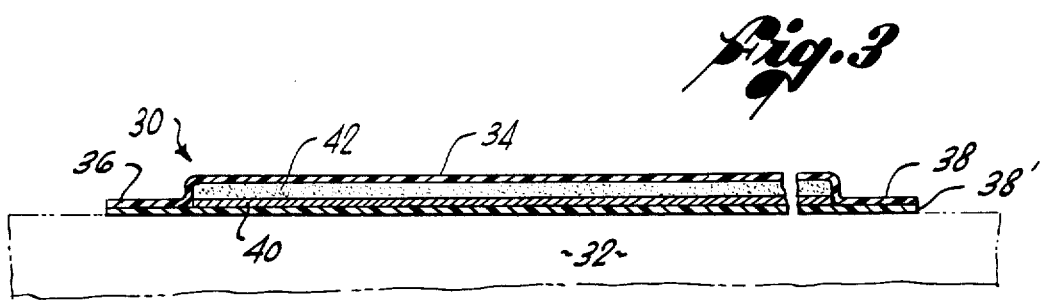
FIG. 3 is an enlarged sectional view similar to FIG. 2 showing another embodiment of the invention.

FIG. 3 illustrates another embodiment of the invention where the reactant is initially dispersed in the diffusion layer prior to assembly of the time-temperature indicating unit. The materials forming the indicator, diffusion layer and reactant are as described above in connection with FIG. 2.

As shown, a time-temperature indicating device, shown generally as 30, is attached to a surface of a package 32 for a temperature sensitive product. The device 30 includes a transparent face portion 34 and a base portion 36 formed by upper and lower plastic sheets 38 and 38'. An indicator 40 is disposed on the upper surface of the sheet 38' in alignment below the face portion 34. A lipoid diffusion layer 42 in which a reactant has been pre-dispersed is disposed over the indicator 40.

The structure of the lipoid diffusion layer 42 is characterized as a molecular thickness film in which the molecules are oriented with the long axis normal to the plane of the film with the hydrophilic group disposed away from the indicator 40. This is accomplished by wetting the sheet 38' with an organic solvent such as decane prior to depositing the lipoid layer. The temperature is maintained above the transition temperature so that the lipoid is in the smectic liquid-crystal state and the molecules are sufficiently mobile to permit their orientation by attraction of the lipophilic portion of the molecule to the organic solvent.

The operation and function of the device 30 is the same as previously described in conjunction with time-temperature indicator 10 of FIG. 2.

The following examples are by way of illustration of the preparation and utilization of devices in accordance with the invention.

EXAMPLE I

A device adapted for the indication of the freshness of photographic film was prepared according to the following method.

A sheet of cellophane approximately 5 cm $\times$ 10 cm was coated with an indicator solution containing alizarin and allowed to dry. The coated sheet was sprayed with water and a 1 cm $\times$ 10 cm strip of dialysis membrane was placed over the center portion of the sheet and permitted to become fully wetted by the water. A drop of a mixture consisting of 40% by weight dimyristoyl lecithin and 60 by weight water maintained at a temperature of about 30° C was placed on the membrane and a second water wetted dialysis membrane was pressed over the drop to spread the drop into a layer between the membranes. The resulting thickness of the lipoid layer was about 0.3 mm.

The assembly was cooled to a temperature of about 0° C and a reaction solution consisting of lauryldiethylamine was sprayed as a thin layer over the upper membrane and the entire assembly was covered with a second 5 cm $\times$ 10 cm transparent cellophane sheet. The upper and lower sheets were heat sealed at their peripheries to form a container for the assembly components.

The resulting device has a transition temperature of 24° C and after 1 day at 25° C a visible color change was observed demonstrating the reactant had diffused through the lipoid layer and had reacted with the indicator layer.

A second device manufactured in the same manner was maintained at 20° C during the test period. No discernible change in the indicator was observed.

EXAMPLE II

A device as shown in FIG. 3 was produced using the same reactant-indicator and lipoid as in Example I according to the following procedure.

A drop of a mixture of dimyristoyl lecithin and lauryl diethylamine (1%) mixture was placed on the surface of water contained in a Langmuir trough and permitted to spread over the water surface as a film. The trough was maintained at a temperature of about 30° C in order to exceed the transition temperature of the lipoid.

A dried, indicator coated cellophane sheet prepared as in Example I was wetted with decanol following which it was applied to the surface of the Langmuir trough with the wetted surface in contact with the lipoid-reactant film was adhered to the surface of the sheet. The sheet was cooled to a temperature of 15° C to prevent the diffusion of the dispersed reactant. A second cellophane sheet was placed over the first sheet and heat sealed thereto to form the finished device.

The device was maintained at a temperature of 25° C for 3 days during which observations were made. At the end of 24 hours the indicator had changed from its initial color of yellow to red.

Time-temperature indicating devices constructed in accordance with the invention provide an inexpensive, easily manufactured device for indicating the permissible storage time of time-temperature sensitive products. The device requires no special tools or accessories for attachment to an article, or its package, and is relatively non-bulky so that no special package modifications are required when using the device of this invention. In addition no special handling of packages or articles on which the device is affixed is required.

Various embodiments and modifications of this invention have been described in the foregoing description, and further modifications will be apparent to those skilled in the art. Such modifications are included within the scope of this invention as defined by the following claims.

I claim:

1. A time-temperature indicating device comprising:
   a diffusion layer of a material having a first impermeable, crystalline-like state and a second permeable, liquid-crystalline state, said material being capable of transition between said first and said second states at a clearly defined temperature;
   an indicator disposed on one side of said diffusion layer; and
   a reactant material for said indicator normally maintained out of contact with said indicator by said diffusion layer, said reactant material having a predetermined rate of diffusion through said diffusion layer to contact and react with said indicator when said diffusion layer is in the permeable, liquid-crystalline state.

2. The device of claim 1 further including container means for enclosing said diffusion layer, said indicator and said reactant material, at least a portion of said means being transparent for viewing the interior thereof.

3. The device of claim 1 wherein said diffusion layer comprises at least a molecular thickness film of a surface-active material comprising a mixture of an organic acid and an organic base, each having between 8 and 20 carbon atoms, the molecules of said film including a hydrophilic and a lipophilic group and being oriented with the long axis of the molecules substantially perpendicular to the plane of said film.

4. The device of claim 3 wherein said surface-active material is a phospholipid.

5. The device of claim 3 wherein said surface-active material comprises the salt of an alcohol-fatty acid ester.

6. The device of claim 1 wherein said diffusion layer material is selected from the group consisting of dioleoyl lecithin, egg yolk lecithin, 1 stearyl-2 oleoyl lecithin, soya lecithin, dimyristoyl lecithin, dipalmitoyl lecithin, phosphatidyl choline, phosphatidyl serine, decanol/sodium caprylate, and hexanol/cethylmethyl ammonium bromide.

7. The device of claim 1 wherein said reactant material is selected from the group consisting of lauryldiethylamine, decanoic acid, aniline, m-chloroaniline, guanidine, dodecanoic acid, propanoic acid and oleic acid.

8. The device of claim 1 wherein said reactant is selected from the group consisting of alizarin, bromcresol green, sodium indigo sulfonate, phenolphthalein, methyl violet, methyl orange and bromthymol blue.

9. The device of claim 1 wherein said reactant is dispersed in said diffusion layer.

10. A time-temperature indicating device for indicating deterioration of perishable goods and the like, said device comprising:
    a time-temperature sensitive component including a reactant material and an indicator responsive to contact by said reactant to produce a visible reaction, said reactant and indicator being normally separated by a diffusion layer having an impermeable, pseudo-crystalline state and a reactant permeable, liquidcrystalline state, said diffusion layer effecting the transition between said impermeable and permeable states at a clearly defined transition temperature; and
    container means for enclosing said time-temperature sensitive component, said container means including a transparent face for viewing said time-temperature component.

11. The device of claim 10 wherein said container means comprises an upper and a lower sheet of a hydrophilic substantially liquid impermeable material, said sheets being bonded together at the peripheral portions thereof.

12. The device of claim 11 further including a liquid permeable membrane disposed on each side of said diffusion layer, between said layer and said reactant and indicator, respectively.

13. The device of claim 10 wherein said diffusion layer comprises a film of a surface-active material having oriented molecular structure, said surface-active material selected from the group consisting of dioleoyl lecithin, egg yolk lecithin, 1 stearoyl2 oleoyl lecithin, soya lecithin, dimyristoyl lecithin, dipalmitoyl lecithin, phosphatidyl choline, phosphatidyl serine, decanol/sodium caprylate and hexanol/cetylmethyl ammonium bromide.

14. The device of claim 10 wherein said diffusion layer has a transition temperature of between about −22° C and about 60° C.

15. The device of claim 10 wherein reactant material is selected from the group consisting of lauryldiethylamine, decanoic acid, aniline, m-chloroaniline, guanidine, beta-napthol, pyridine, dodecanoic acid, propanoic acid, and oleic acid.

16. The device of claim 10 wherein the time required for diffusion of said reactant through said diffusion layer is between about 3 hours to about 7 days.

17. The device of claim 10 wherein said reactant material is disposed as a layer on one side of said diffusion layer.

18. The device of claim 11 wherein said indicator is bonded to the inner surface of one of said upper and lower sheets.

19. The device of claim 10 wherein said time-temperature component comprising a diffusion layer of dimyristoyl lecithin having a transition temperature of about 24° C, lauryldiethylamine as said reactant having a diffusion time through said diffusion layer of about 24 hours, and alizarin as an indicator of said reactant.

20. The device of claim 10 wherein said diffusion layer is dimyristoyl lecithin having about 1% by weight thereof of lauryldiethylamine dispersed in said diffusion layer.

21. A time-temperature indicating device for indicating deterioration of perishable goods and the like, said device comprising:
    a time-temperature sensitive component including a reactant material and an indicator responsive to contact by said reactant material to produce a visible reaction, said reactant material being dispersed in a diffusion layer disposed adjacent said indicator, and said diffusion layer having an impermeable, pseudo-crystalline state and a reactant-permeable, liquid-crystalline state, wherein said diffusion layer effects a transition between said impermeable and permeable states at a clearly defined transition temperature; and
    container means for enclosing said time-temperature sensitive component, said container means including a transparent face for viewing said time-temperature component.

* * * * *